(12) United States Patent
    Hugh

(10) Patent No.: US 12,663,112 B1
(45) Date of Patent: Jun. 23, 2026

(54) MONITOR STAND

(71) Applicant: HnL Monitor Stand LLC, Cerritos,
CA (US)

(72) Inventor: Howard Dennis Hugh, Cerritos, CA
(US)

( * ) Notice: Subject to any disclaimer, the term of this
patent is extended or adjusted under 35
U.S.C. 154(b) by 10 days.

(21) Appl. No.: 18/810,492

(22) Filed: Aug. 20, 2024

Related U.S. Application Data

(60) Provisional application No. 63/520,931, filed on Aug.
21, 2023.

(51) Int. Cl.
    *A47B 23/00* (2006.01)
    *F16M 11/10* (2006.01)
    *F16M 11/22* (2006.01)
(52) U.S. Cl.
    CPC ............. *F16M 11/10* (2013.01); *F16M 11/22*
    (2013.01); *A47B 23/001* (2013.01); *A47B*
    *2023/005* (2013.01); *F16M 2200/022*
    (2013.01)
(58) Field of Classification Search
    CPC ............ A47B 23/001; A47B 2023/005; A47B
    23/043; A47B 23/044
    USPC ....... 248/458, 459, 460, 461, 463, 462, 464,
    248/465, 454, 455, 456
    See application file for complete search history.

(56) References Cited

U.S. PATENT DOCUMENTS

| | | | | |
|---|---|---|---|---|
| 2,449,492 | A | 9/1948 | Long | |
| 2,505,814 | A | 5/1950 | Voorhorst | |
| 5,290,002 | A * | 3/1994 | Cohen | A47B 23/043 |
| | | | | 248/456 |
| 6,019,050 | A | 2/2000 | Ranta | |
| 11,297,941 | B1 * | 4/2022 | Hadar | A47B 23/043 |
| 2005/0188899 | A1 | 9/2005 | Yovich | |
| 2009/0289166 | A1 * | 11/2009 | Hopfer | A47B 23/043 |
| | | | | 248/456 |
| 2010/0155346 | A1 * | 6/2010 | Cheng | A47B 23/043 |
| | | | | 211/13.1 |
| 2012/0235008 | A1 * | 9/2012 | Schwartz | F16M 11/10 |
| | | | | 248/454 |
| 2015/0041609 | A1 | 2/2015 | Lee | |

* cited by examiner

*Primary Examiner* — Alfred J Wujciak
(74) *Attorney, Agent, or Firm* — Makoui Law, PC; Ali
Makoui

(57) ABSTRACT

A foldable monitor stand includes a top panel, a bottom
panel, a support panel, and a base. In an unfolded state of the
monitor stand, the support panel is rotated around several
hinges to maintain a first angle with the bottom panel, the
bottom panel is rotated around one or more hinges to
maintain a second angle with the base, and the support panel
maintains a third angle with the base. The top panel is
connected to the bottom panel. A sliding clip is configured
to slide through a tray connected to the back of the top panel.
The sliding clip and a shelf connected to the front of the top
panel are configured to hold a monitor. The base and the
support panel extend backward and are positioned behind
the back panel, allowing a laptop to be placed directly below
the monitor without placing the laptop on the base.

20 Claims, 17 Drawing Sheets

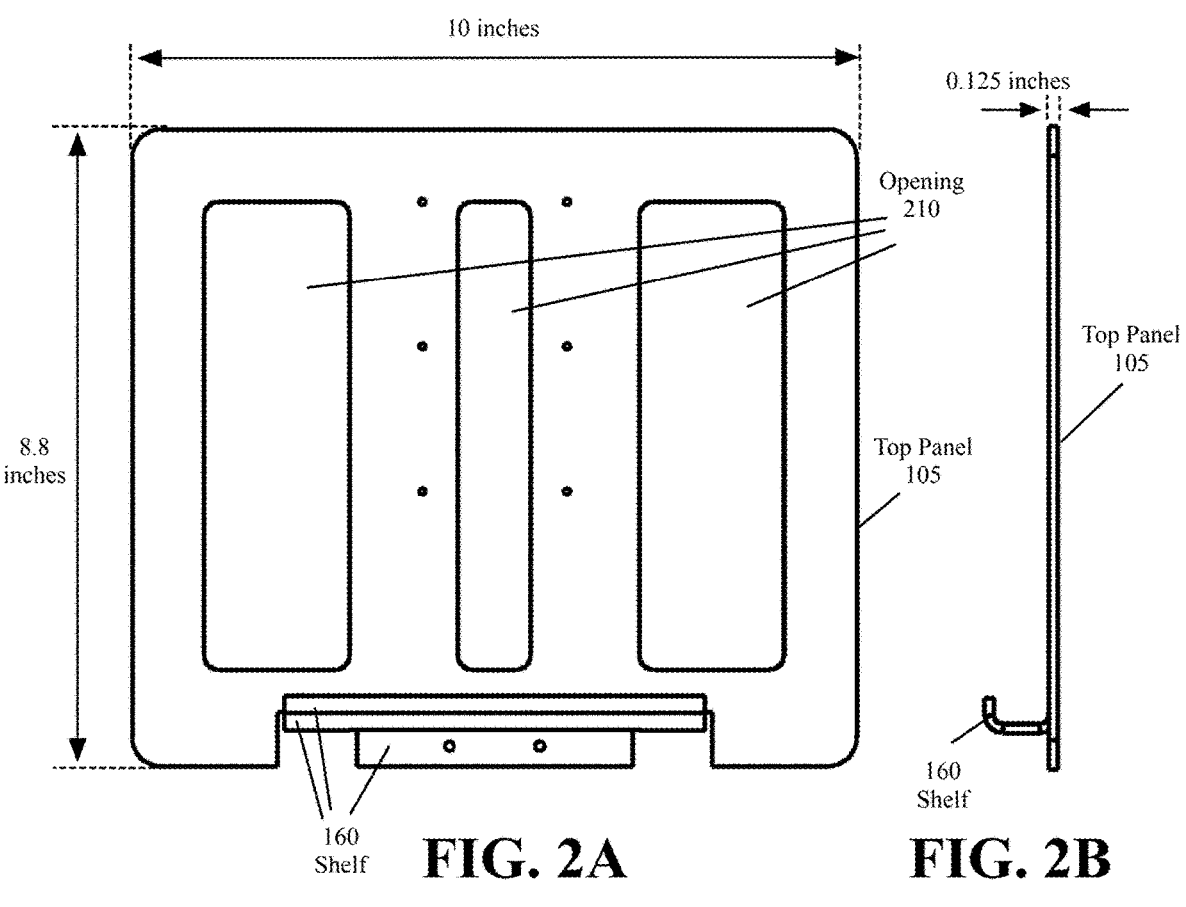
FIG. 2A
FIG. 2B
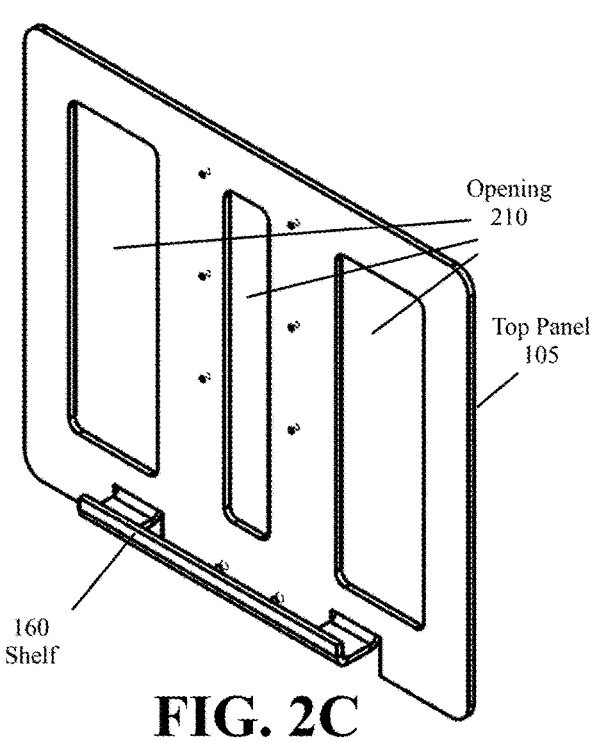
FIG. 2C

0.125 inches

Base
130

Base
130

171
Hole 10 inches

172
Hole 5.8
inches 1.9 inches

Clip
115

Grip
620

Shaft
610

3.2
inches

Stopper
650

650
Stopper

Grip
620

Clip
115

Shaft
610

0.125 inches

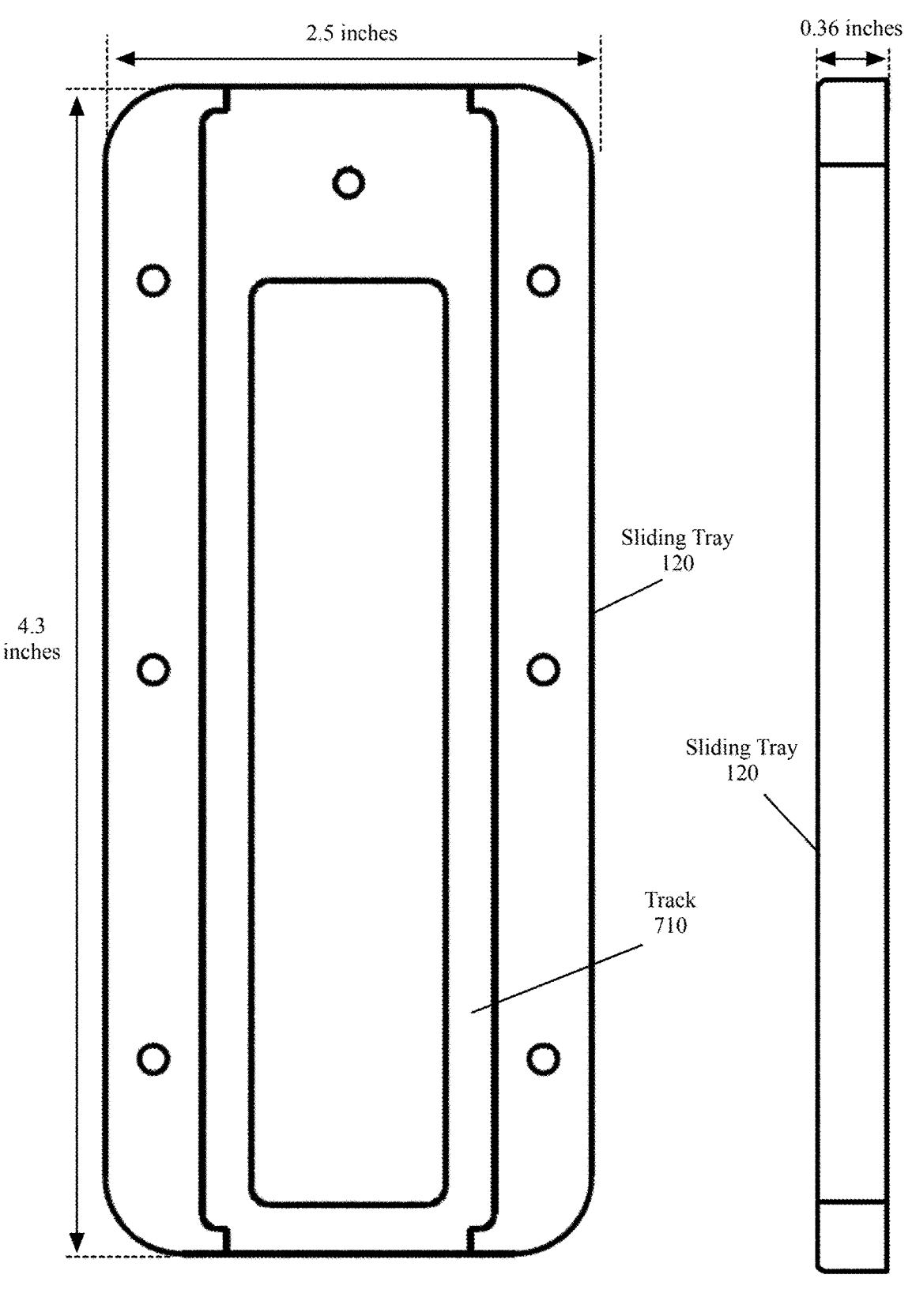
FIG. 7A            FIG. 7B

FIG. 9A FIG. 9B

MONITOR STAND

CLAIM OF BENEFIT TO PRIOR APPLICATIONS

This application claims the benefit of U.S. Provisional Patent Application Ser. No. 63/520,931, filed on Aug. 21, 2023. The contents of U.S. Provisional Patent Application 63/520,931 are hereby incorporated by reference.

BACKGROUND

Many people may use a laptop for several hours a day. Because of the low height of a laptop, people may have to bend their necks to look down at the laptop screen. Spending long periods of time bending over a laptop may cause symptoms such as forward head posture, resulting in sharp pain in the neck and back.

A monitor, positioned on a monitor stand, and connected to the laptop by a cable may be used by individuals who work on laptops for many hours a day to allow viewing at eye level. A monitor stand is a supportive device designed to hold up a computer monitor. Monitor stands may be used to raise the height of the monitor screen to prevent the users from having to look downward. By using a proper monitor stand, individuals may position the monitor at more or less the same level as their eyes.

BRIEF DESCRIPTION OF THE DRAWINGS

The various embodiments of the present monitor stand now will be discussed in detail with an emphasis on highlighting the advantageous features. These embodiments depict the novel and non-obvious monitor stand shown in the accompanying drawings, which are for illustrative purposes only. These drawings include the following figures, in which like numerals indicate like parts:

FIG. 2A is a front elevation view, FIG. 2B is a right side elevation view, and FIG. 2C is a front perspective view of the top panel and the shelf of a monitor stand, according to various aspects of the present disclosure;

FIG. 7A is a back elevation view, FIG. 7B is a right side elevation view.

DETAILED DESCRIPTION

Figure 1A:
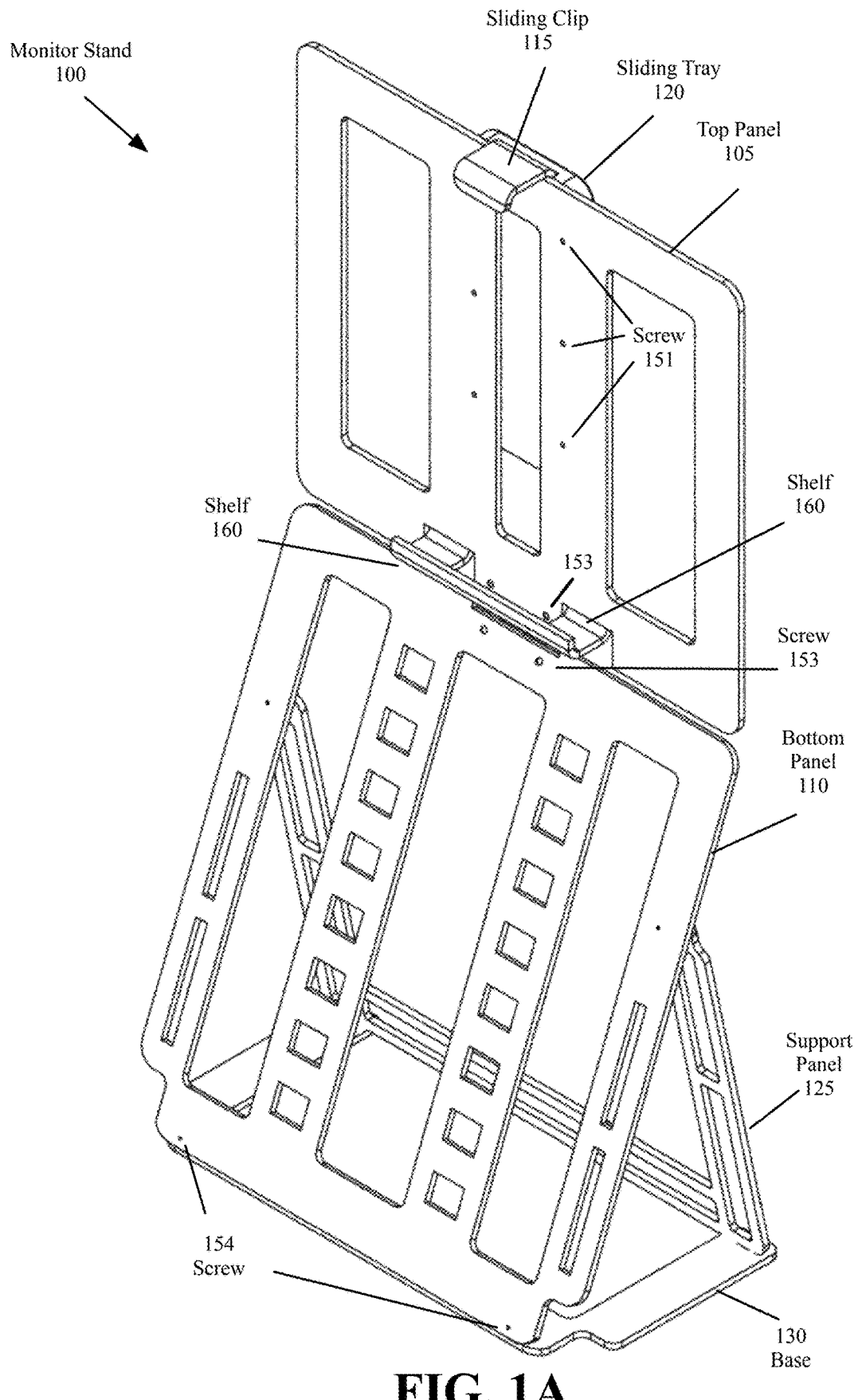
FIG. 1A illustrates a front perspective view and FIG. 1B illustrates a back perspective view of a monitor stand, according to various aspects of the present disclosure.

People who use laptops often work in small areas such as coffee shop tables, library desks, etc. These individuals often carry the laptops in backpacks or small carrying cases. One aspect of the present embodiments includes the realization that the previously provided monitor stands for laptops are bulky and may not be practical to use in small work areas. Furthermore, these monitor stands may not be foldable or may not fold to a size that allows the monitor stands to be carried in a backpack with the monitor and/or the laptop. The existing monitor stands may include a base that extends from below the monitor toward the user, requiring the laptop to be placed either on the side of monitor stand or over the base of the monitor stand.

The present embodiments, as described in detail below, solve the above-mentioned shortcomings by providing a foldable monitor stand with a base and a supportive leg (e.g., a support panel) that extend backward and are positioned behind a monitor that is held by the monitor stand, allowing the laptop to be placed on the work area directly below the monitor. The monitor stand of the present embodiments has a small footprint allowing it to be used in small work areas. The monitor stand of the present embodiments may be folded to a small size that may allow the monitor stand to be carried in a small backpack with the monitor and/or the laptop.

The monitor stand may include a top panel, a bottom panel, a support panel, and a base. The support panel and the base may be connected to the back side of the bottom panel. The base may be hingedly connected to the lower edge of the bottom panel. The support panel may be hingedly connected to the back of the bottom panel. The base may be configured to stand on the work area. In an unfolded state of the monitor stand, the support panel may be rotated around several hinges to maintain a first angle with the bottom panel, the bottom panel may be rotated around one or more hinges to maintain a second angle with the base, and the support panel may maintain a third angle with the base.

The top panel may be used to hold the monitor. The top panel may include (or may be connected to) a shelf to hold the bottom edge of the monitor and a clip to hold the top edge of the monitor. The clip may be height adjustable to allow the monitor stand to hold different sizes of monitors. The top panel may be hingedly connected to the bottom panel to allow the viewing angle of the monitor to be adjusted by tilting the top panel against the bottom panel.

The remaining detailed description describes the present embodiments with reference to the drawings. In the drawings, reference numbers label elements of the present embodiments. These reference numbers are reproduced below in connection with the discussion of the corresponding drawing features.

Figure 1B:
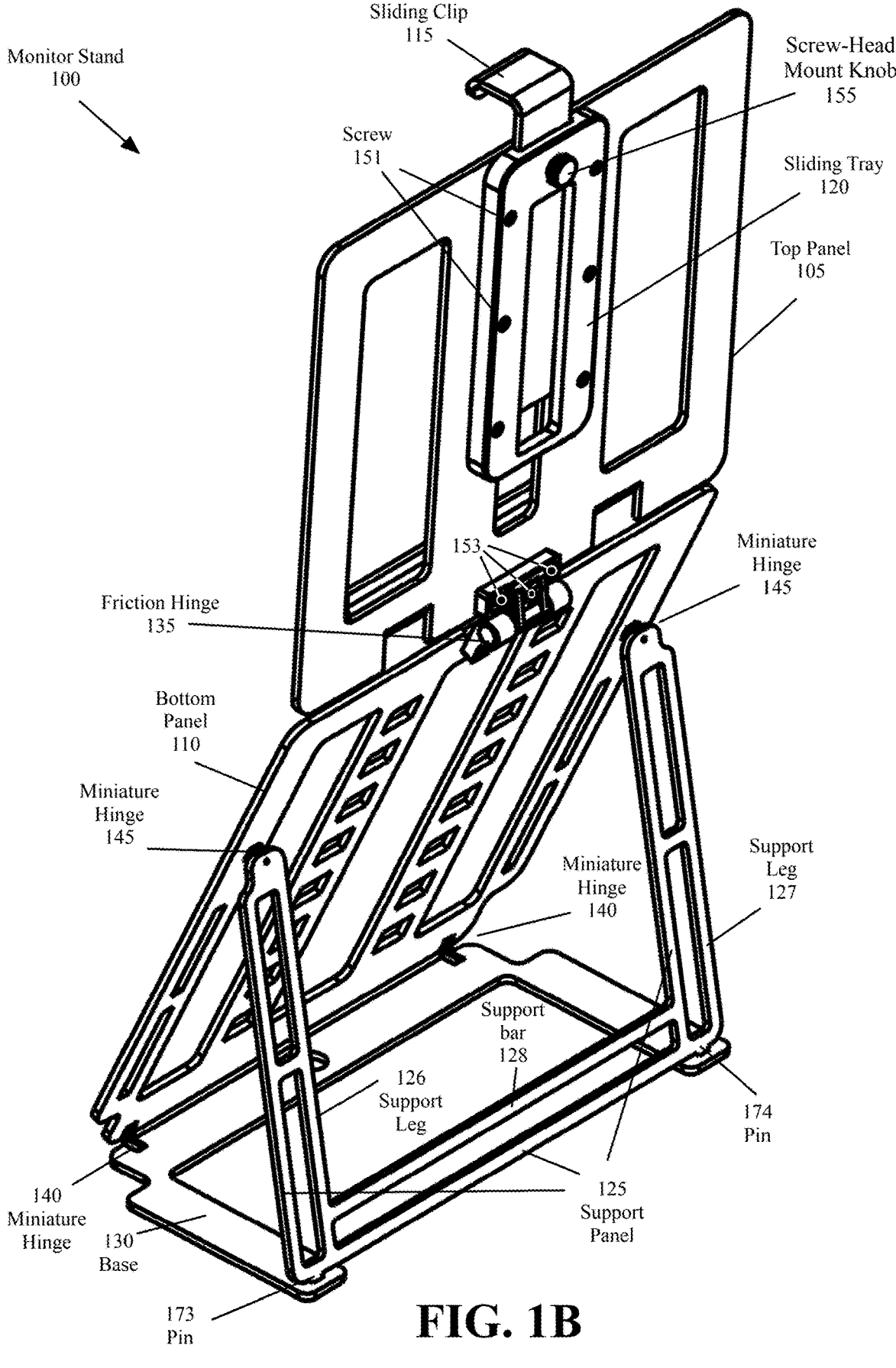
Figure 1C:
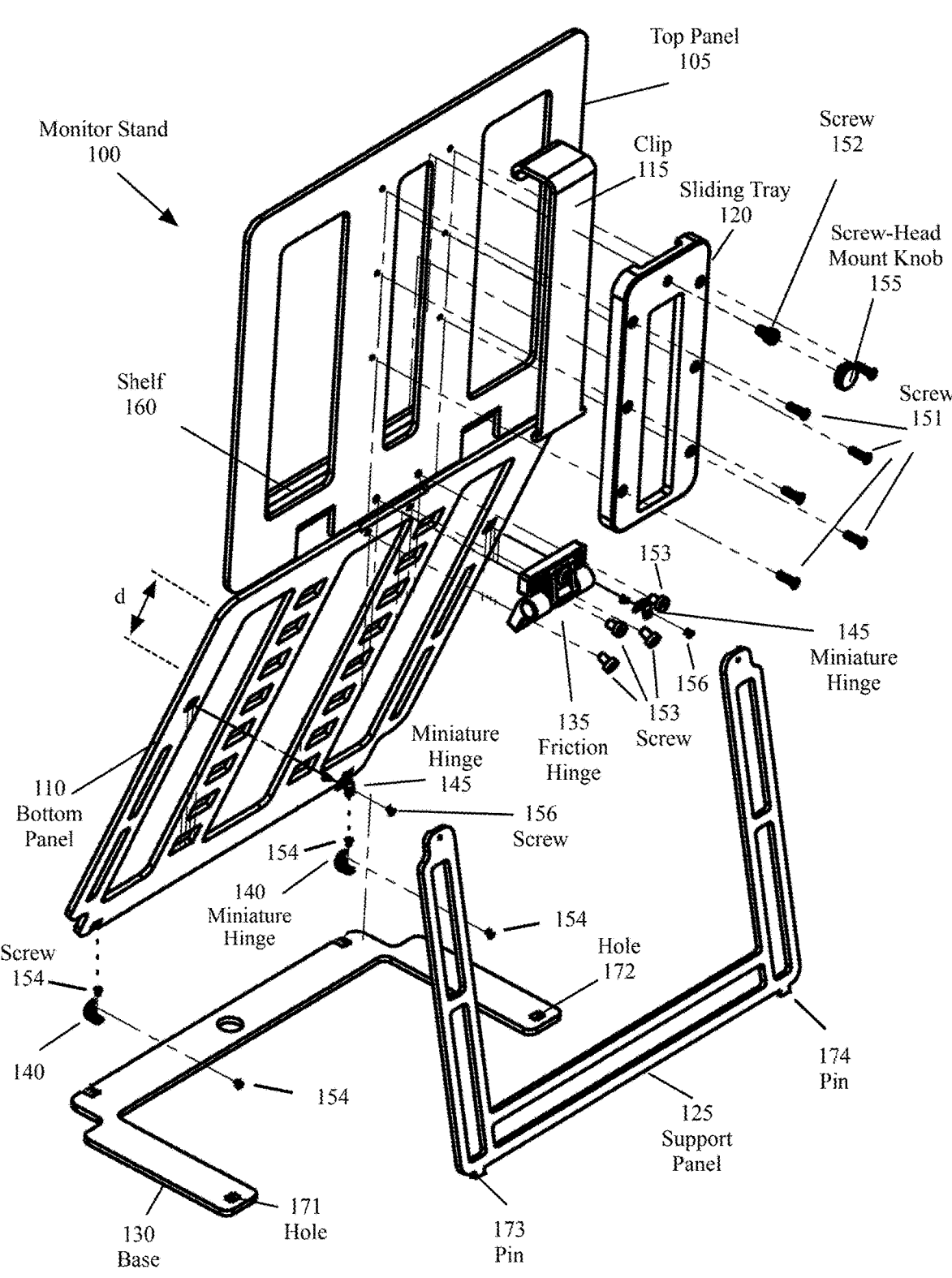
FIG. 1C is an exploded view of the monitor stand of FIGS. 1A-1B.

Some of the present embodiments provide a lightweight foldable monitor stand with a small footprint that allows the monitor stand to be used on small work areas and be carried in a small backpack when folded. FIG. 1A illustrates a front perspective view and FIG. 1B illustrates a back perspective view of a monitor stand 100, according to various aspects of the present embodiments. FIG. 1C is an exploded view of the monitor stand 100 of FIGS. 1A-1B. The monitor stand 100 is shown in an unfolded state in FIGS. 1A-1B.

With reference to FIGS. 1A-1C, the monitor stand 100 may include a top panel 105, a bottom panel 110, a support panel 125, and a base 130. The support panel 125 may be connected to the back side of the bottom panel 110 about 7.5 inches (e.g., between 6.5 to 7.5 inches) from the lower edge of the bottom panel 110. The base 130 may be connected to the back side at the bottom edge of the bottom panel 110. In this specification, the term front refers to the side of the monitor stand that faces a person who is watching a monitor that is held by the monitor stand 100. The term back refers to the side of the monitor stand that is opposite to the person who is watching the monitor that is held by the monitor stand 100.

The base 130 may be connected to the lower edge of the bottom panel 110 by one or more hinges 140. The hinge(s) 140, in some embodiments, may be miniature hinges and may be secured to the base 130 and the bottom panel 110 by one or more screws 154. The screws 154 may, for example, and without limitations, be rust proof passivated stainless steel flat head Phillips screws.

The support panel 125 may be hingedly connected to the back of the bottom panel 110. For example, and without limitations, the support panel 125 may be connected to the back of the bottom panel 110 by two hinges 145 that may be positioned at a distance of about ⅓ of the length of the bottom panel 110 from the top edge of the bottom panel 110 (as shown by the distance "d" in FIG. 1C). For example, the two hinges 145 may be positioned between 3 to 4 inches from the top edge of the bottom panel 110. The hinges 145, in some embodiments, may be miniature hinges and may be secured to the support panel 125 and the bottom panel 110 by one or more screws 156. The screws 156 may, for example, and without limitations, be rust proof passivated stainless steel flat head Phillips screws.

The base 130 may be configured to be positioned on the surface of the work area. For example, the bottom surface of the base 130 may contact a support surface, such as the top of a table, the top of a desk, etc. The top surface of the base 120 (e.g., the surface that faces up when the monitor stand is placed on a supporter surface), may include several holes 171-172. The holes 171-172, in some embodiments, may only be on the top surface of the base 130. In other embodiments, the holes 171-172 may go through the top and bottom surfaces of the base 130

In the unfolded state of the monitor stand 100, the support panel 125 may be rotated around the hinges 145 to maintain a first angle with the bottom panel 110, the bottom panel 110 may be rotated around the hinge(s) 140 to maintain a second angle with the base 130, and the support panel 125 may maintain a third angle with the base 130. In some embodiments, the first angle may be between 33 degrees to 37 degrees, the second angle may be between 68 degrees to 72 degrees, and the third angle may be between 73 degrees to 78 degrees.

The support panel 127, in some embodiments, may include two support legs 126 and 127 that may be connected to each other by a support bar 128. In some embodiments, the support panel 125 may include several pins 173-174 that may fit into the corresponding holes 171-172 on the base 130. In the depicted embodiment, there is a pin 172-174 on each supporting leg 126-127, respectively. Once the pins 173-174 are inserted into the corresponding holes 171-172, the support panel 125 and the base may securely hold the bottom panel 110, the top panel 105, and a monitor that may be held by the top panel 105.

The top panel 105 may be used to hold the monitor. The top panel 105 may include (or may be connected to) a shelf 160 to hold the bottom edge of the monitor and a clip 115 to hold the top edge of the monitor. The shelf 160 may be substantially parallel to (e.g., with an angle of +/−5 degrees) to the bottom edge of the top panel 105. The clip may be height adjustable to allow the monitor stand 100 to hold different sizes of monitors. The top panel 105 may be hingedly connected to the bottom panel to allow the viewing angle of the monitor to be adjusted by tilting the top panel against the bottom panel. For example, the top panel 105 may be connected to the bottom panel by one or more hinges (one hinge 135 is shown in FIG. 1B for clarity).

The hinge 135, in some embodiments, may be a friction hinge. A friction hinge is a hinge that gives resistance to the pivoting motion. Friction hinges, which are commonly used as laptop hinges, may be used to control motion or hold a pivoting object opened or closed. The friction hinge, in some embodiments may be an adjustable friction hinge that may include a friction control (e.g., a screw or a knob) to adjust the friction resistance of the hinge. The hinge 135 may be used to adjust the angle between the top panel 105 and the bottom panel 110, for example to keep the screen of a monitor held by the monitor stand 100 at a desired position for a viewer. For example, the hinge 135 may be used to adjust the angle between the top panel 105 and the bottom panel 110 to keep the screen of the monitor held by the monitor stand 100 at a substantially vertical position (e.g., with +/−5 degrees angle from a local vertical coordinate, commonly referred to as z direction or the direction that is opposite to the direction of gravity).

The hinge 135, in some embodiments, may be connected the bottom panel 110 by several screws 153. The screws 153, for example, and without limitations, may be Phillips head, screws, socket head cap screws, etc. A Phillips head screw includes a head that includes a cross shaped slot and may be tightened or loosened by a Phillips screwdriver. A socket head cap screw includes a cylindrical head and a hexagonal recessed drive, which may be tightened or loosened by a hex wrench or Allen key.

The clip 115 may be configured to slide up and down inside the sliding tray 120 to provide grip for the top edge of monitors with different heights. For example, the clip 115 and the sliding tray 120, in some embodiments, may be configured to provide grip for monitors with heights from 13.3 inches to 18.5 inches. The sliding tray 120, in some embodiments, may be connected to the top panel 105 by several screws 151. The screws 151 may, for example, and without limitations, be rust proof passivated stainless steel flat head Phillips screws. The screw 152 may be used to loosen or tighten the clip 115 inside the sliding tray 120. The screw 152 may, for example, and without limitations, be a grey-oxide alloy steel knurled knob screw to provide cor-
rosion and abrasion resistant to allow the quick loosing or
tightening of the sliding clip 115. In some embodiments, an
adhesive, such as glue, may be applied to the screws 151,
152, 153, 154, and 156 during assembly. In these embodi-
ments, the screws may only be removed by first applying
heat (e.g., with a torch) and then unscrewing them loose.

Figure 2D:
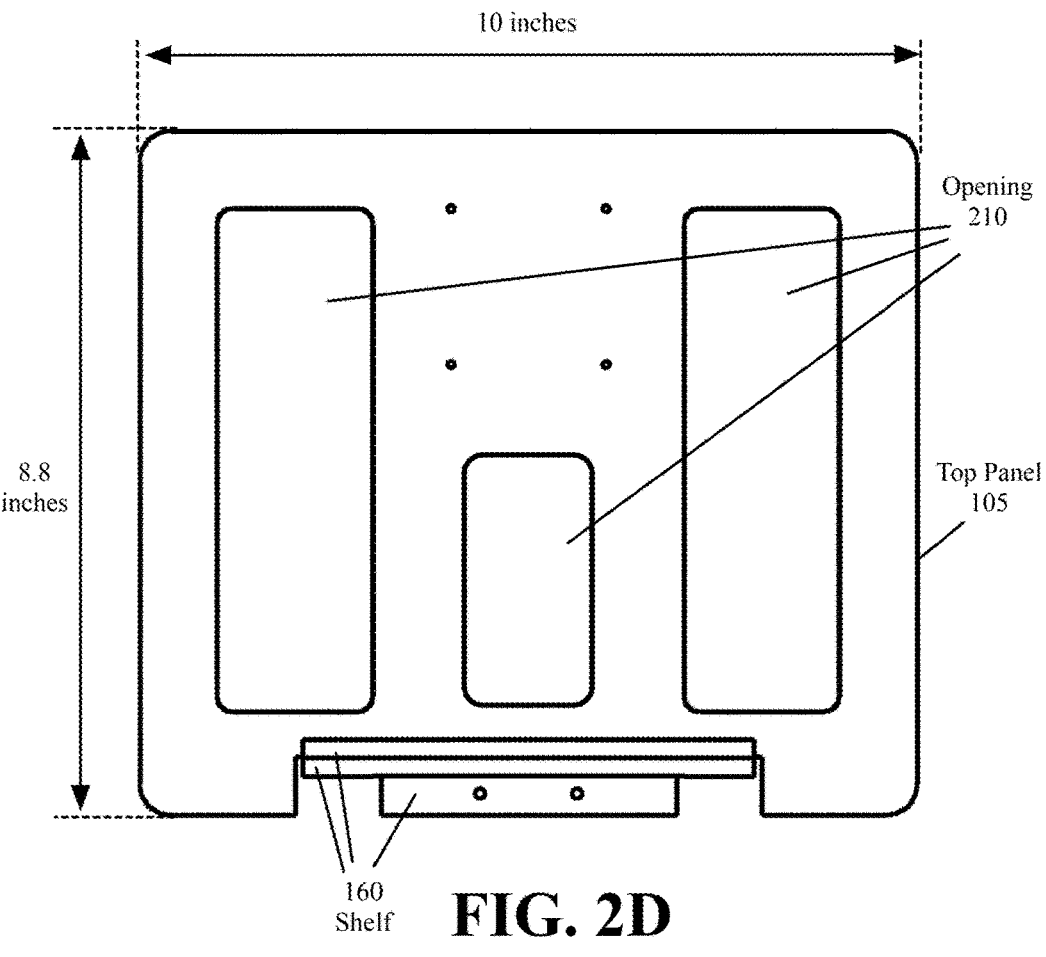
FIG. 2D is a front elevation view and FIG. 2E is a front perspective view of a monitor stand's top panel with an alternative number and sizes of openings, according to various aspects of the present disclosure.
Figure 2E:
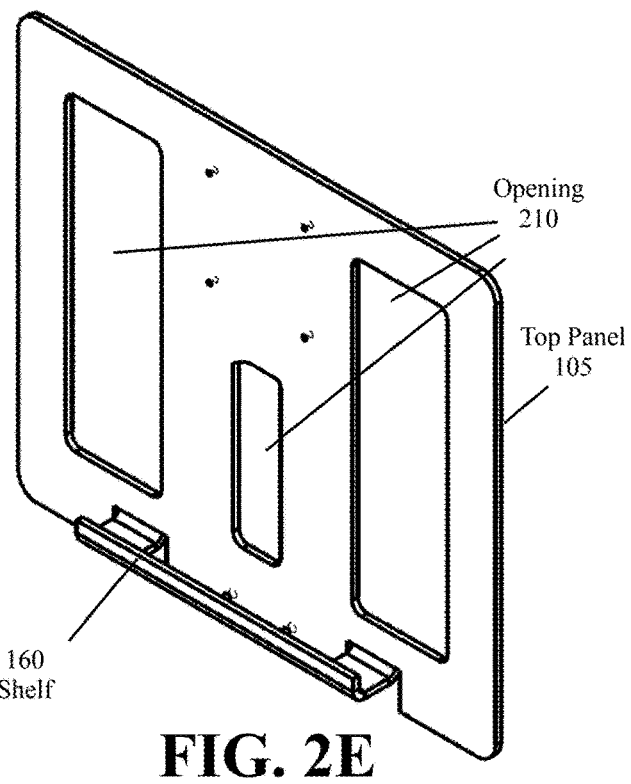

The top panel 105, the bottom panel 110, the support
panel 125, and the base 130, in some embodiments, may
have small dimensions to create a small footprint for the
monitor stand and to allow the monitor stand 100 to be
folded to a small size that may allow the monitor stand 100
to be carried in a small backpack with a monitor and/or a
laptop. FIG. 2A is a front elevation view, FIG. 2B is a right
side elevation view, and FIG. 2C is a front perspective view
of the top panel 105 and the shelf 160 of a monitor stand,
according to various aspects of the present disclosure. As
shown, the top panel 105, in some embodiments, may be
about 10 inches wide (e.g., between 9 to 11 inches wide),
about 8.5 inches long (e.g., between 8 to 9 inches wide), and
about 0.125 inches thick (e.g., between 0.1 to 0.25 inches
thick). The top panel 105, in some embodiments, may be
made of aluminum composite material (ACM). The benefits
of ACM are lighter weight, minimal warpage, and less
expensive than aluminum. The shelf 160, in some embodi-
ments, may be made of iron. The iron may be coated to
prevent rust. As shown, the top panel 105 may include large
openings 210 (e.g., between 16.4% to 34.2% of the total
surface area of the top panel) to reduce the weight of the top
panel 105. FIG. 2D is a front elevation view and FIG. 2E is
a front perspective view of a monitor stand's top panel 105
with an alternative number and sizes of openings 210,
according to various aspects of the present disclosure.

Figures 3A, 3B:
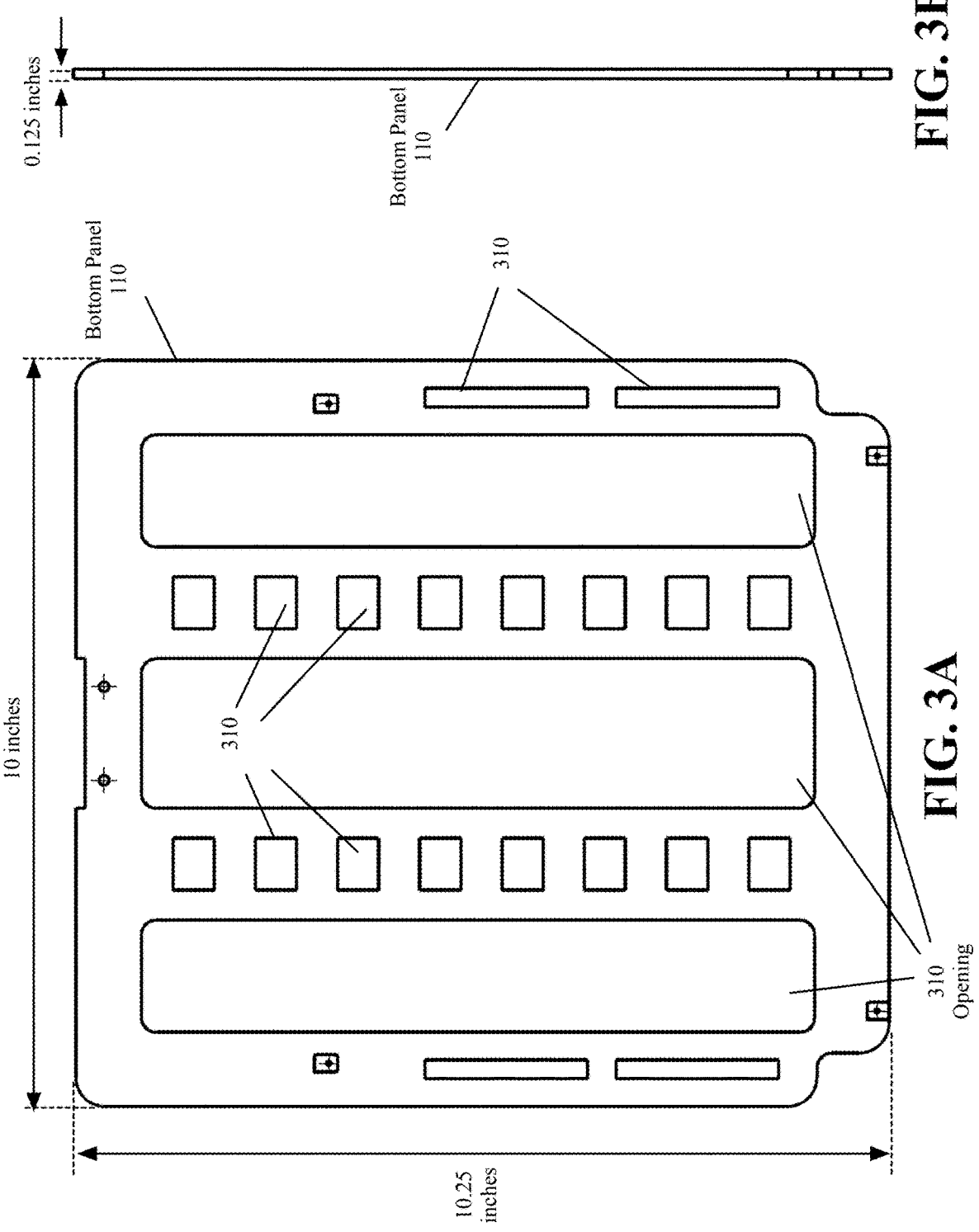
FIG. 3A is a back elevation view and FIG. 3B is a right side elevation view of the bottom panel of a monitor stand, according to various aspects of the present disclosure.
Figure 3C:
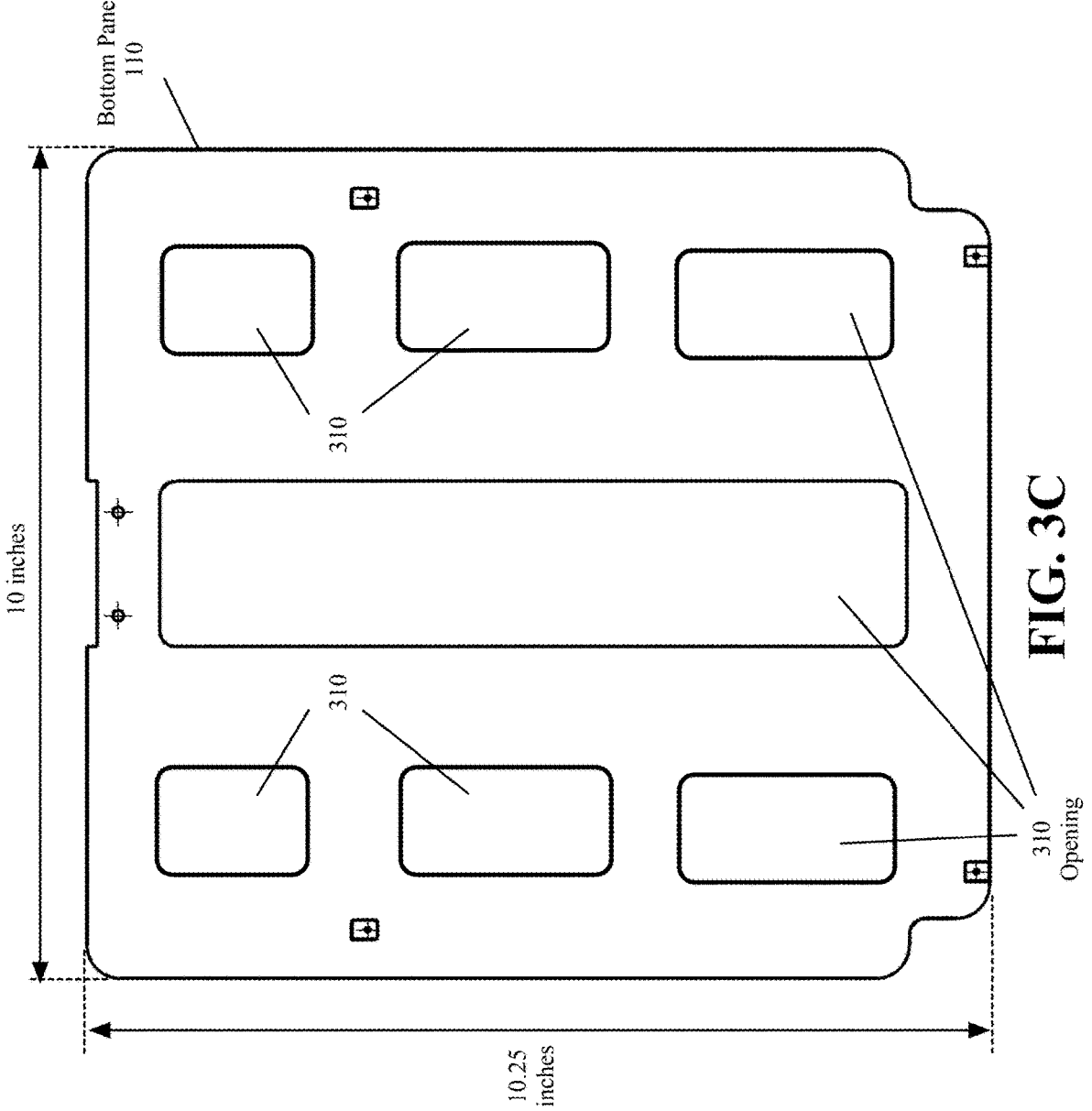
FIG. 3C is a back elevation view of a monitor stand's bottom panel with alternative number and sizes of openings, according to various aspects of the present disclosure.

FIG. 3A is a back elevation view and FIG. 3B is a right
side elevation view of the bottom panel 110 of a monitor
stand, according to various aspects of the present disclosure.
As shown, the bottom panel 110, in some embodiments, may
be about 10 inches wide (e.g., between 9 to 11 inches wide),
about 10.25 inches long (e.g., between 8.5 to 10.25 inches
long), and about 0.125 inches thick (e.g., between 0.125 to
0.25 thick). The bottom panel 110, in some embodiments,
may be made of ACM. As shown, the bottom panel 110 may
include large openings 310 (e.g., from 5% to 25% of the total
surface area of the bottom panel 110) to reduce the weight
of the bottom panel 110. FIG. 3C is a back elevation view
of a monitor stand's bottom panel 110 with alternative
number and sizes of openings 310, according to various
aspects of the present disclosure. In some embodiments, the
bottom panel 110 may not include any openings.

Figures 4A, 4B:
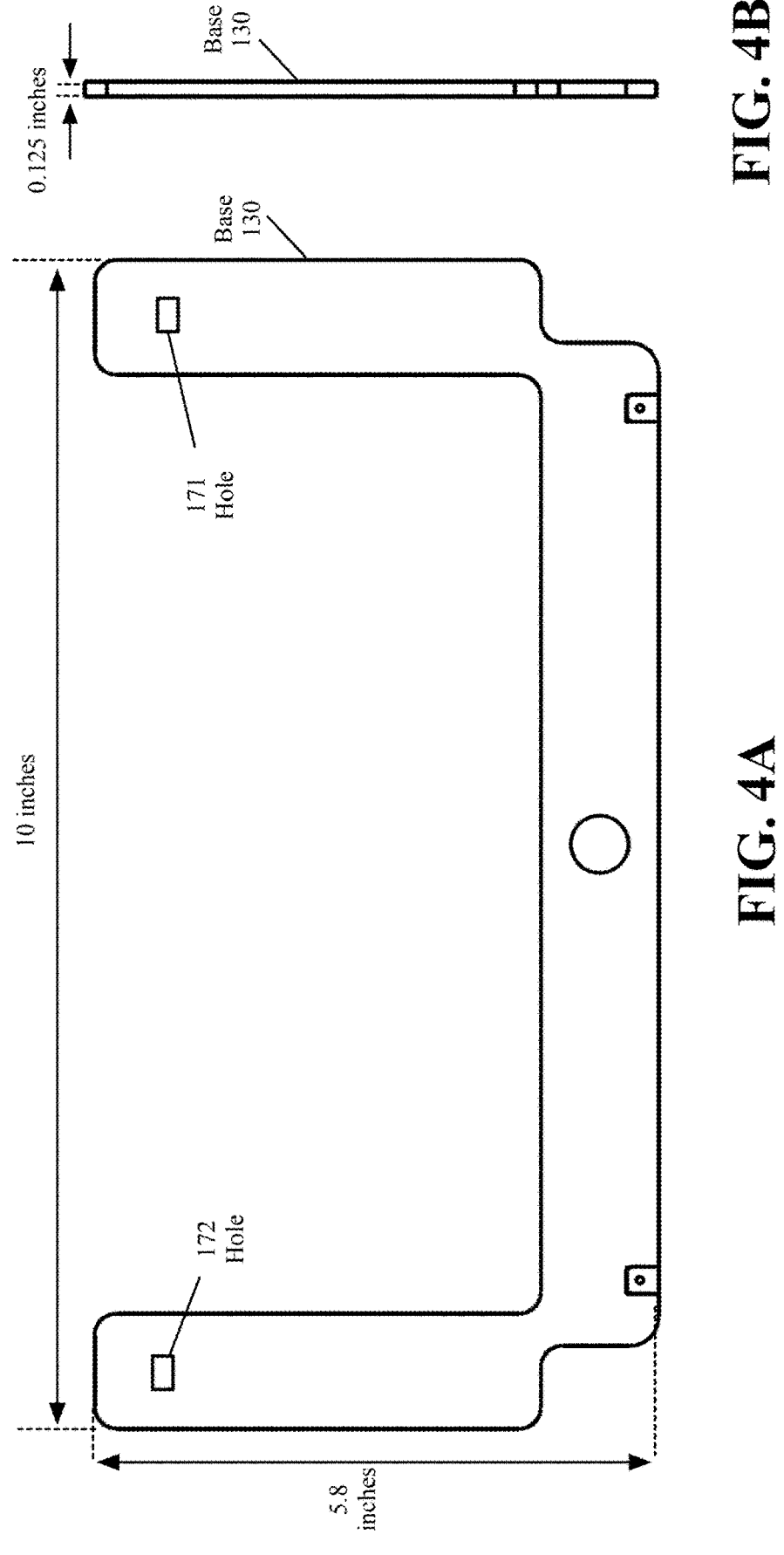
FIG. 4A is a top view and FIG. 4B is a right side elevation view of the base of a monitor stand, according to various aspects of the present disclosure.

FIG. 4A is a top view and FIG. 4B is a right side elevation
view of the base 130 of a monitor stand, according to various
aspects of the present disclosure. As shown, the base 130, in
some embodiments, may be about 10 inches wide (e.g.,
between 9 to 11 inches wide), about 5.8 inches long (e.g.,
between 4 to 5.8 inches long), and about 0.125 inches thick
(e.g., between 0.125 to 0.25 inches thick). The base 130, in
some embodiments, may be made of iron to increase the
weight of the base for stability. The iron may be coated to
prevent rust. In other embodiments, the base 130 may be
made of a lightweight metal, such as, aluminum or titanium.

Figures 5A, 5B:
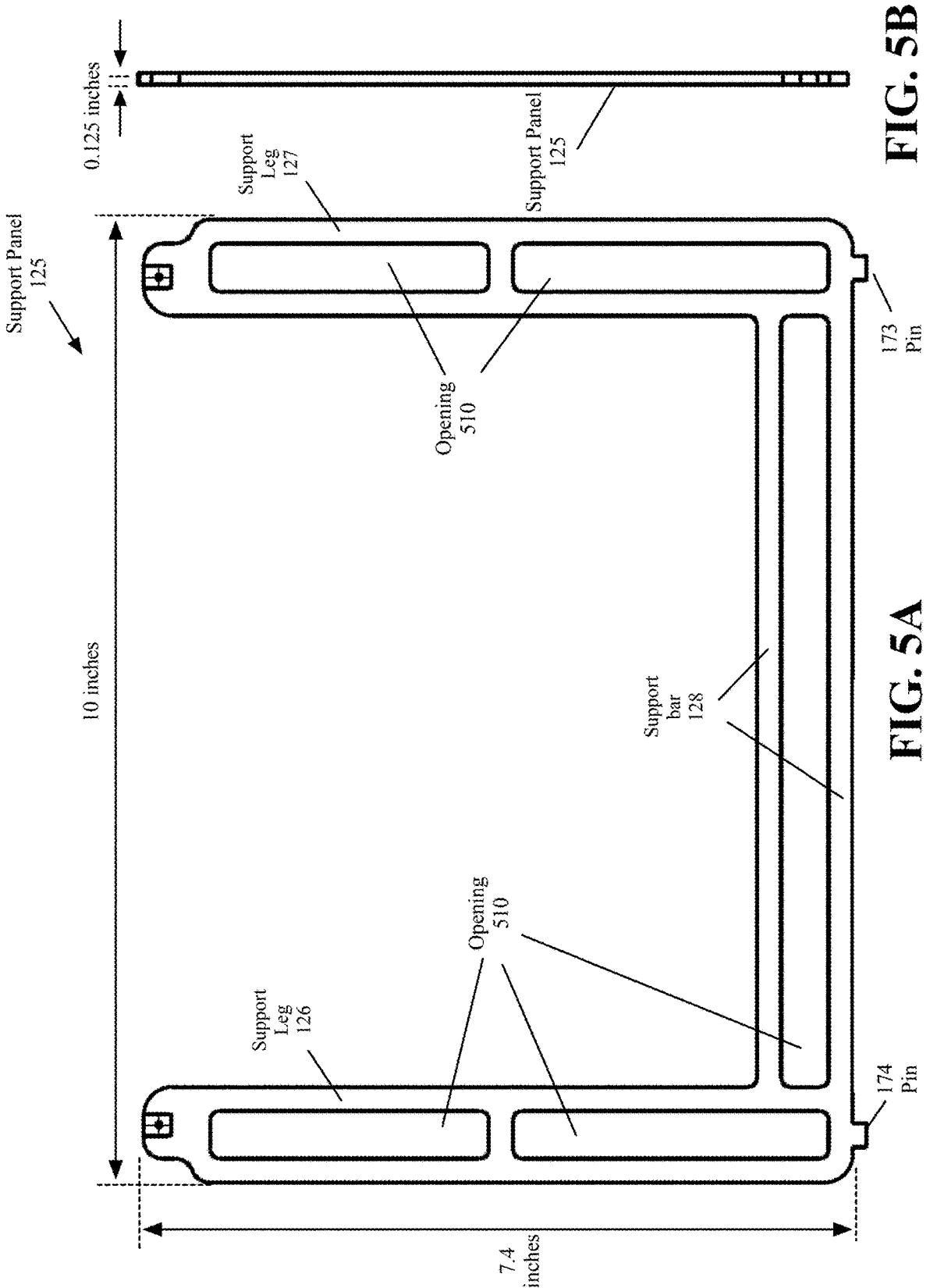
FIG. 5A is a front elevation view and FIG. 5B is a right side elevation view of the support panel of a monitor stand, according to various aspects of the present disclosure.

FIG. 5A is a front elevation view and FIG. 5B is a right
side elevation view of the support panel 125 of a monitor
stand, according to various aspects of the present disclosure.
As shown, the support panel 125, in some embodiments,
may be about 10 inches wide (e.g., between 9 to 11 inches
wide), about 7.4 inches long (e.g., between 6.5 to 7.5 inches
long), and about 0.125 inches thick (e.g., between 0.125 to 0.25 inches thick). The support panel 125, in some embodi-
ments, may be made of iron to increase the weight of the
base for stability. The iron may be coated to prevent rust.
The support panel 125, in some embodiments, may be made
of a lightweight metal, such as, aluminum or titanium. As
shown, the support panel 125 may include large openings
510, which may cover between 33% to 62% of the total
surface area of the support panel) to reduce the overall
weight of the monitor stand 100.

Figures 6A, 6B:
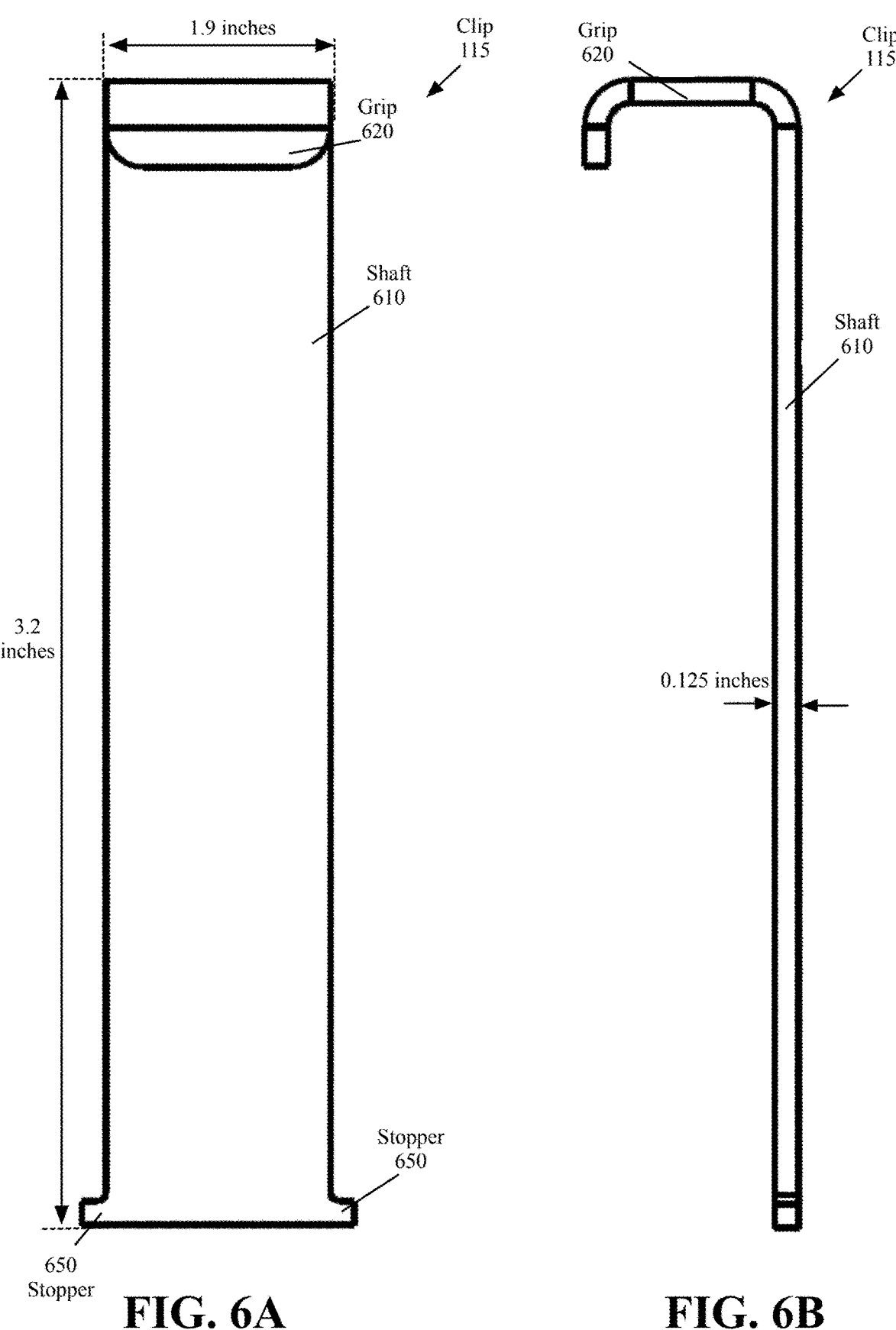
FIG. 6A is a front elevation view.
FIG. 6B is a right side elevation view.
Figure 6C:
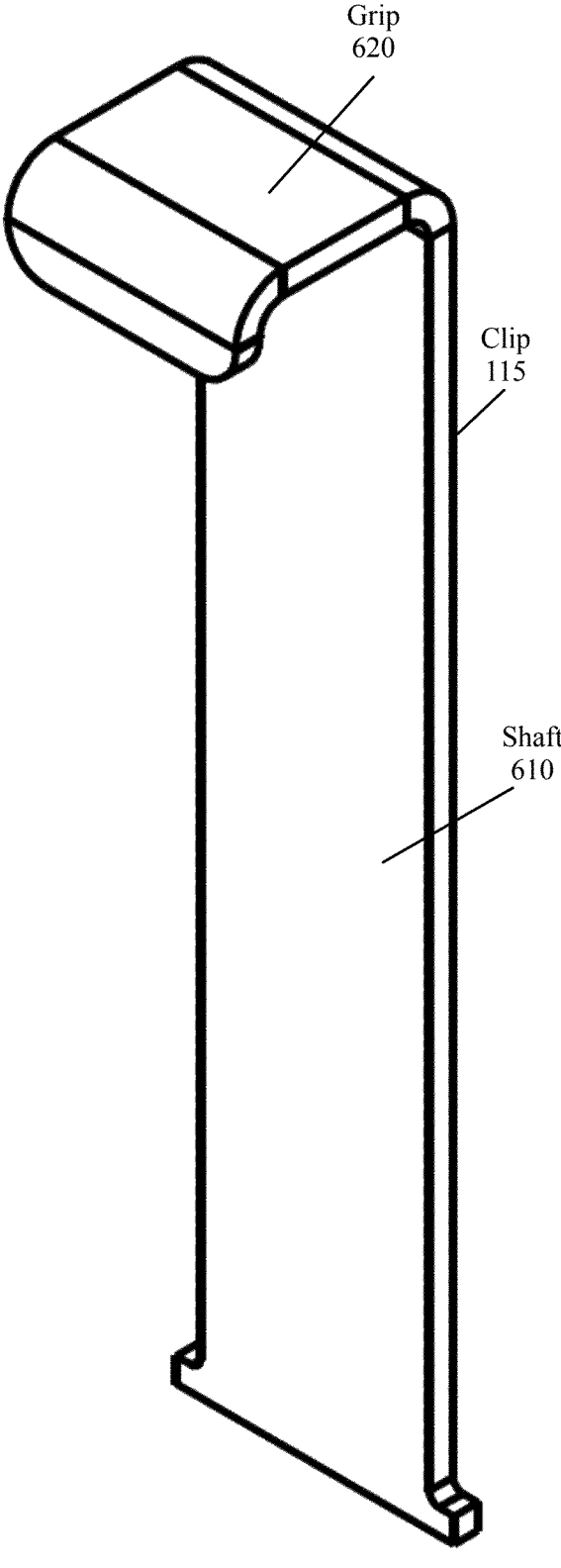
FIG. 6C is a perspective view of the clip of a monitor stand, according to various aspects of the present disclosure.

FIG. 6A is a front elevation view, FIG. 6B is a right side
elevation view, and FIG. 6C is a perspective view of the clip
115 of a monitor stand, according to various aspects of the
present disclosure. As shown, the clip 115, in some embodi-
ments, may be about 1.9 inches wide (e.g., between 1.5 to
2.9 inches wide), about 3.2 inches long (e.g., between 3.1 to
7.3 inches long), and about 0.125 inches thick (e.g., between
0.125 to 0.25 inches thick). The clip 115, in some embodi-
ments, may be made of iron to increase the weight of the
base for stability. The iron may be coated to prevent rust.
The clip 115, in some embodiments, may be made of a
lightweight metal, such as, aluminum or titanium. The clip
115 may include a shaft 610 that is configured to move up
and down inside the sliding tray 120 (FIGS. 1A-1C). The
clip 115 may include the stoppers 650 to prevent the clip 115
to slide out of the top of the sliding tray 120.

Figure 7C:
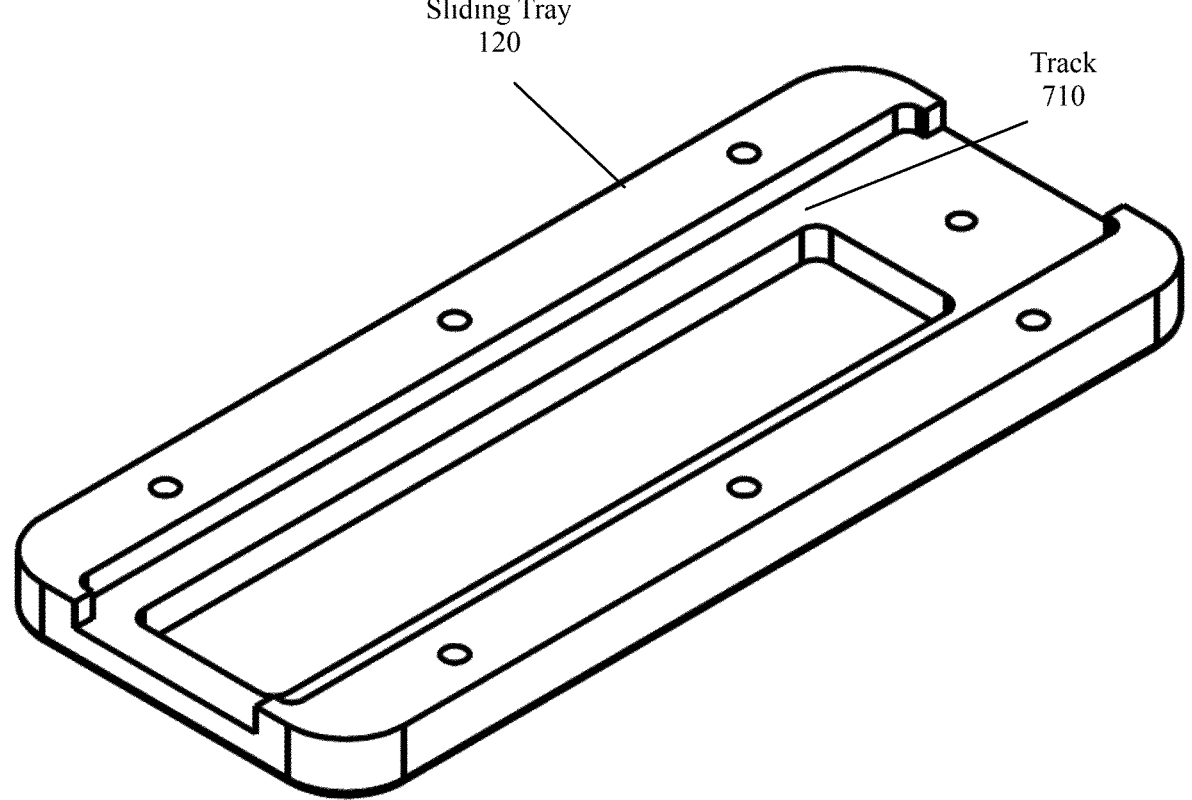
FIG. 7C is a perspective view of the sliding tray of a monitor stand, according to various aspects of the present disclosure.

FIG. 7A is a front elevation view, FIG. 7B is a right side
elevation view, and FIG. 7C is a perspective view of the
sliding tray 120 of a monitor stand, according to various
aspects of the present disclosure. The sliding tray 120 may
include a track 710 where the clip 115 may move up and
down.

As shown, the sliding tray 120, in some embodiments,
may be about 2.5 inches wide (e.g., between 2.1 to 5.3
inches wide), about 4.3 inches long (e.g., between 3.9 to 6
inches long), and about 0.36 inches thick (e.g., between 0.3
to 0.5 inches thick). The sliding tray 120, in some embodi-
ments, may be made of plastic or a lightweight metal, such
as, aluminum or titanium.

Figure 8:
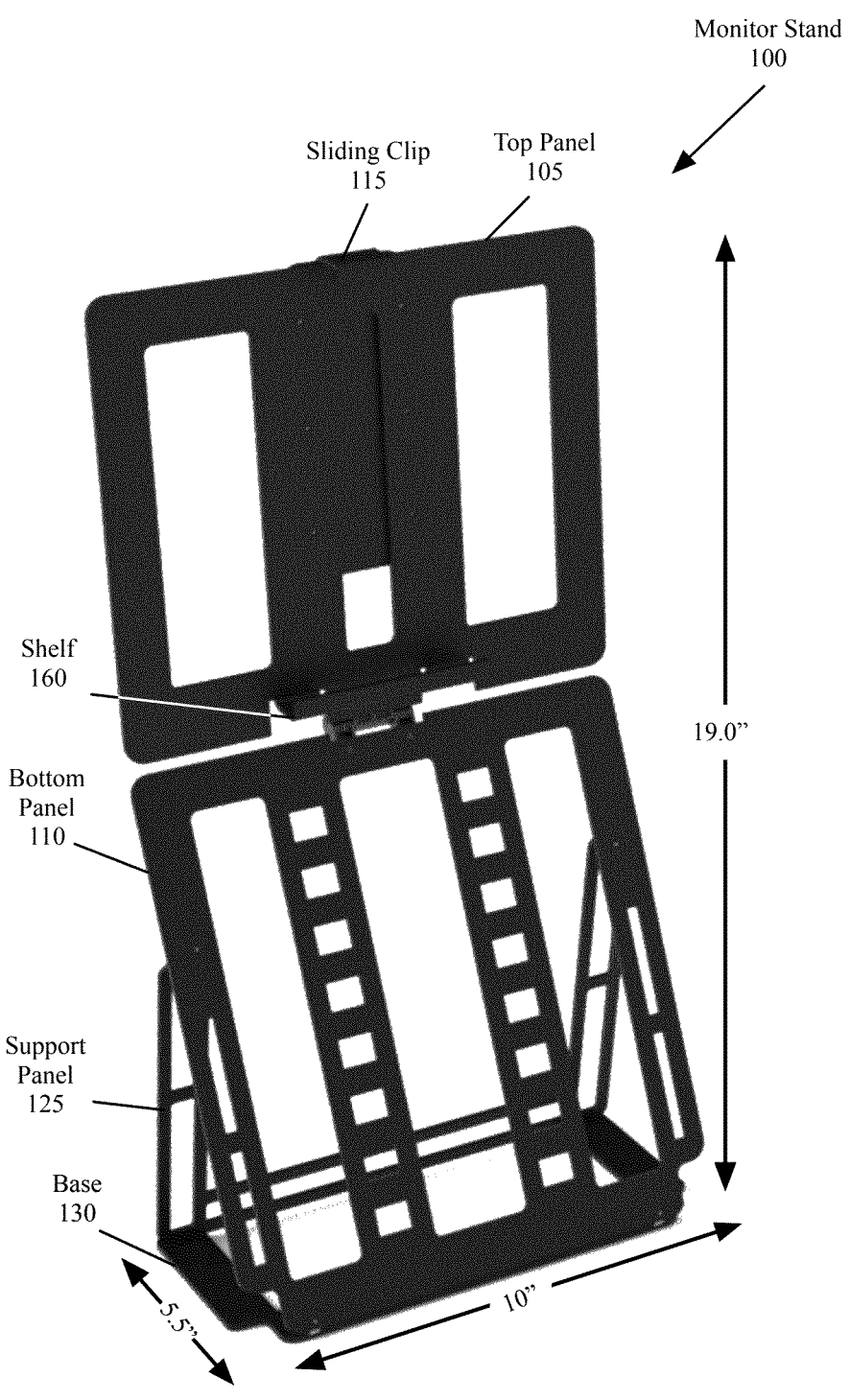
FIG. 8 is a front perspective of a monitor stand showing the approximate dimensions of a monitor stand that is positioned on a work area surface, according to various aspects of the present disclosure.

As described above, the monitor stand of the present
embodiments has a small footprint allowing it to be used in
small work areas. FIG. 8 is a front perspective of a monitor
stand 100 showing the approximate dimensions of a monitor
stand 100 that is positioned on a work area surface, accord-
ing to various aspects of the present disclosure.

Figure 10:
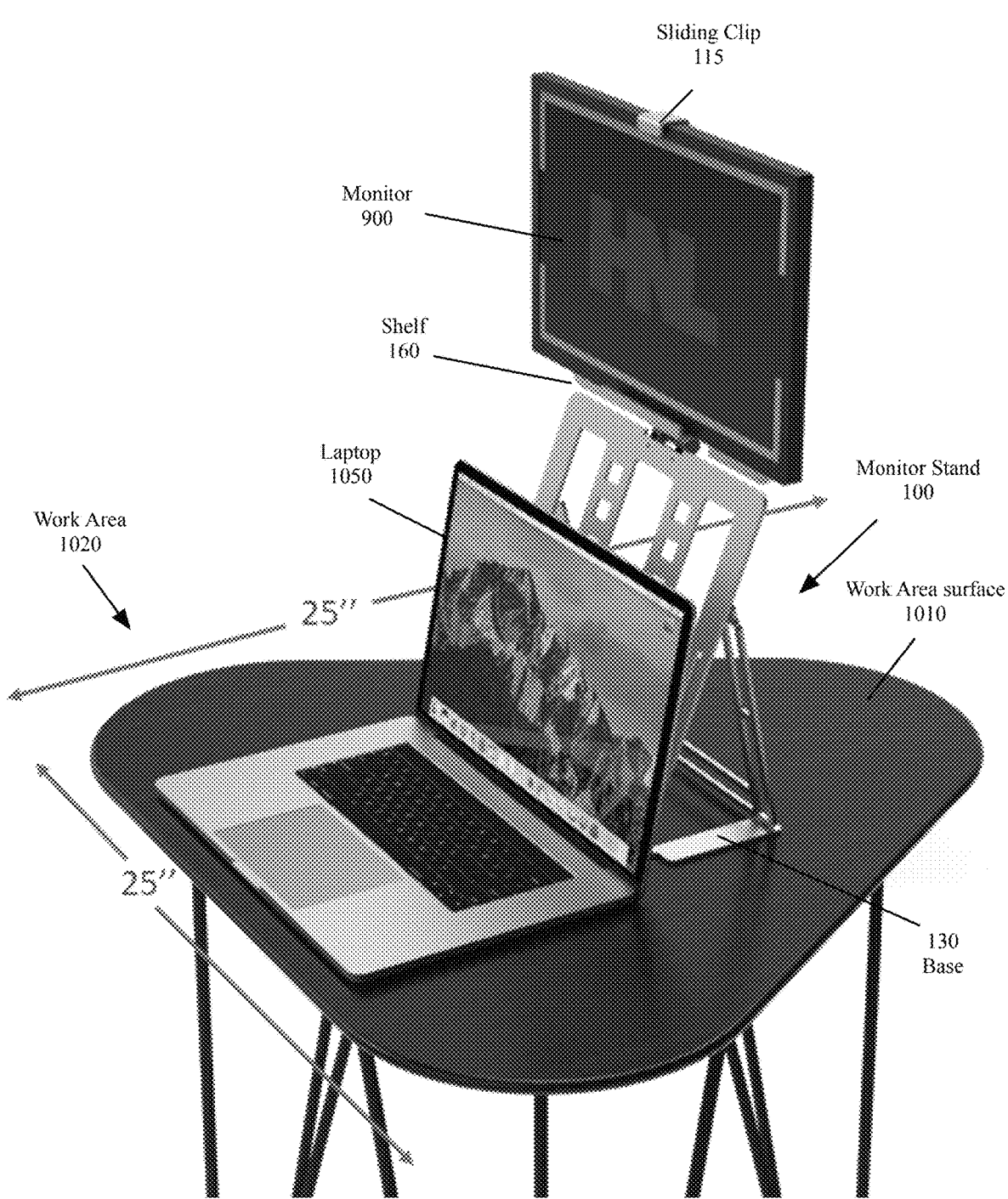
FIG. 10 is a front perspective of a monitor stand with a monitor attached between the shelf and the clip, according to various aspects of the present disclosure.

With reference to FIG. 8, the monitor stand 100 provides
the technical advantage of having a footprint that is no more
than 10 inches wide and no more than 5.5 inches long,
allowing the monitor stand 100 to positioned and used on
small surfaces (e.g., as shown with reference to FIG. 10). As
shown in FIG. 8, the height of the fully assembled monitor
stand 100 that is positioned on a work area surface does not
exceed 19 inches (without the clip 115 being extended).

Figure 9:
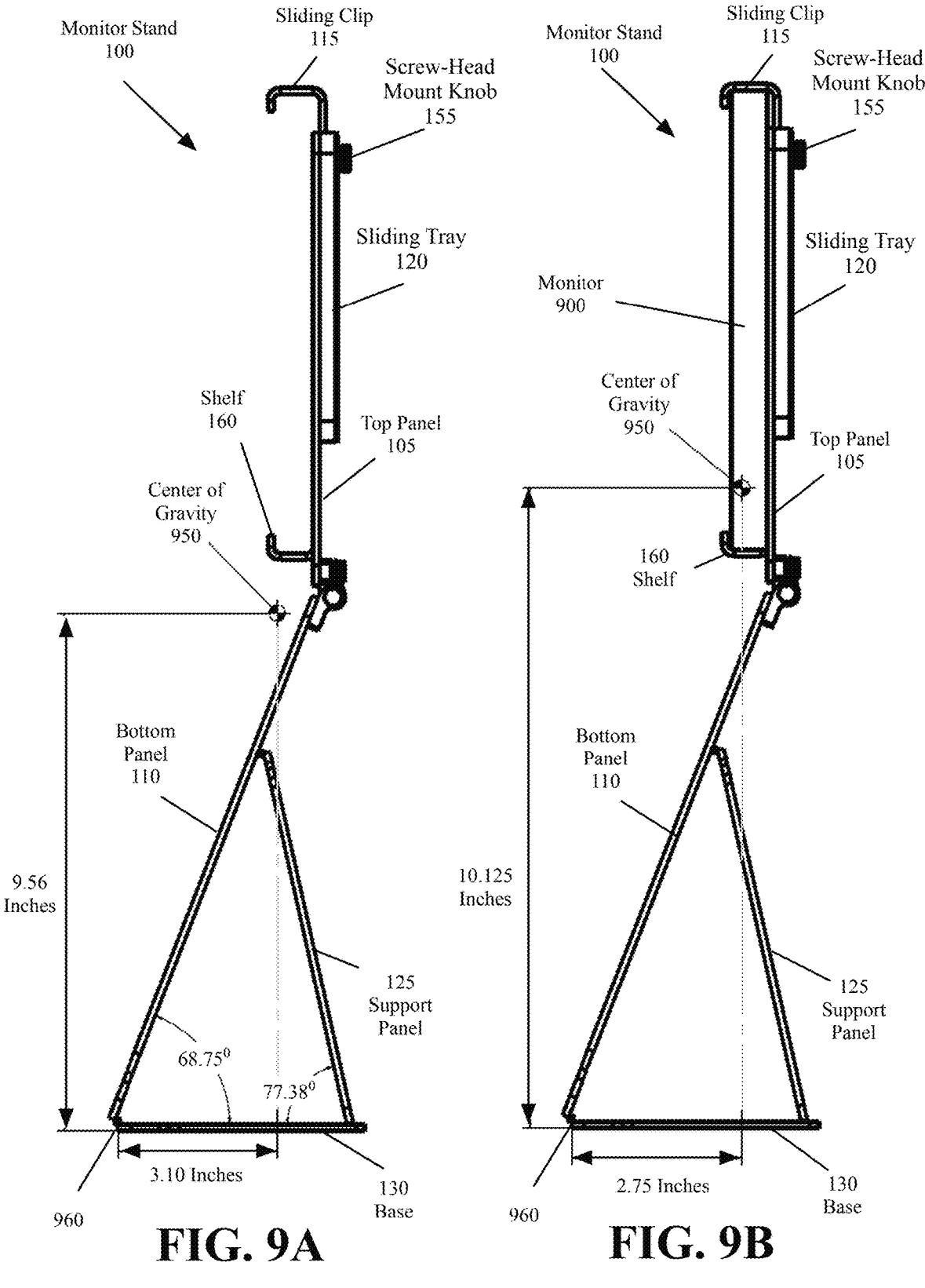
FIG. 9A is a right elevation view showing the center of gravity of a monitor stand 100, according to various aspects of the present disclosure.
FIG. 9B is a right elevation view showing the center of gravity of a monitor stand and a monitor that is attached between the shelf and the clip of the monitor stand, according to various aspects of the present disclosure.

FIG. 9A is a right elevation view showing the center of
gravity 950 of a monitor stand 100, according to various
aspects of the present disclosure. FIG. 9B is a right elevation
view showing the center of gravity 950 of a monitor stand
100 and a monitor 900 that is attached between the shelf 160
and the clip 115 of the monitor stand 100, according to
various aspects of the present disclosure.

With reference to FIG. 9A, the total weight of the monitor
stand, in some embodiments, may be less that 2.25 pounds
(lb). As shown in FIG. 9A, the center of gravity 950 of the
monitor stand 100 is about 9.56 inches above the bottom of
the base 130 and about 3.10 inches (e.g., between 2.5 to 3.2
inches) behind the front most point 960 of the monitor stand
100.

With reference to FIG. 9B, the monitor 900 may, for example, be a 15 inch monitor weighting around 1.64 lb. The total weight of the monitor stand 100 and the monitor 900 may, therefore, be less than 3.89 lb. As shown in FIG. 9B, the center of gravity 950 of the monitor stand 100 and the attached monitor 900 is about 10.125 inches (e.g., between 8.5 to 10.3 inches) above the bottom of the base 130 and about 2.75 inches (e.g., between 2.5 to 3.5 inches) behind the front most point 960 of the monitor stand 100.

FIG. 10 is a front perspective of a monitor stand 100 with a monitor 900 attached between the shelf 160 and the clip 115, according to various aspects of the present disclosure. With reference to FIG. 10, the work area 1020 may, for example, be a small table, such as a table at a coffee shop or kitchen. The surface 1010 of the work area 1020 in this example does not exceed 25 inches by 25 inches.

As shown, the base 130 of the monitor stand 100 extends away from the face of the monitor 900. The monitor stand 100 of the present embodiments provides the technical advantage of allowing a laptop 1050 to be positioned below the monitor 900 without placing the laptop over the base 130. The prior art monitor stands require the laptop to be either positioned on the side of the monitor stand or to be positioned over the monitor's base, that may cause the laptop to become unstable. In addition, the monitor stand 100 of the present embodiments provides the technical advantage of being able to stand upright and fully support the weight of the monitor 900 without the monitor stand having to lean on the body of the laptop, as required by some prior art monitor stands.

Figure 11:
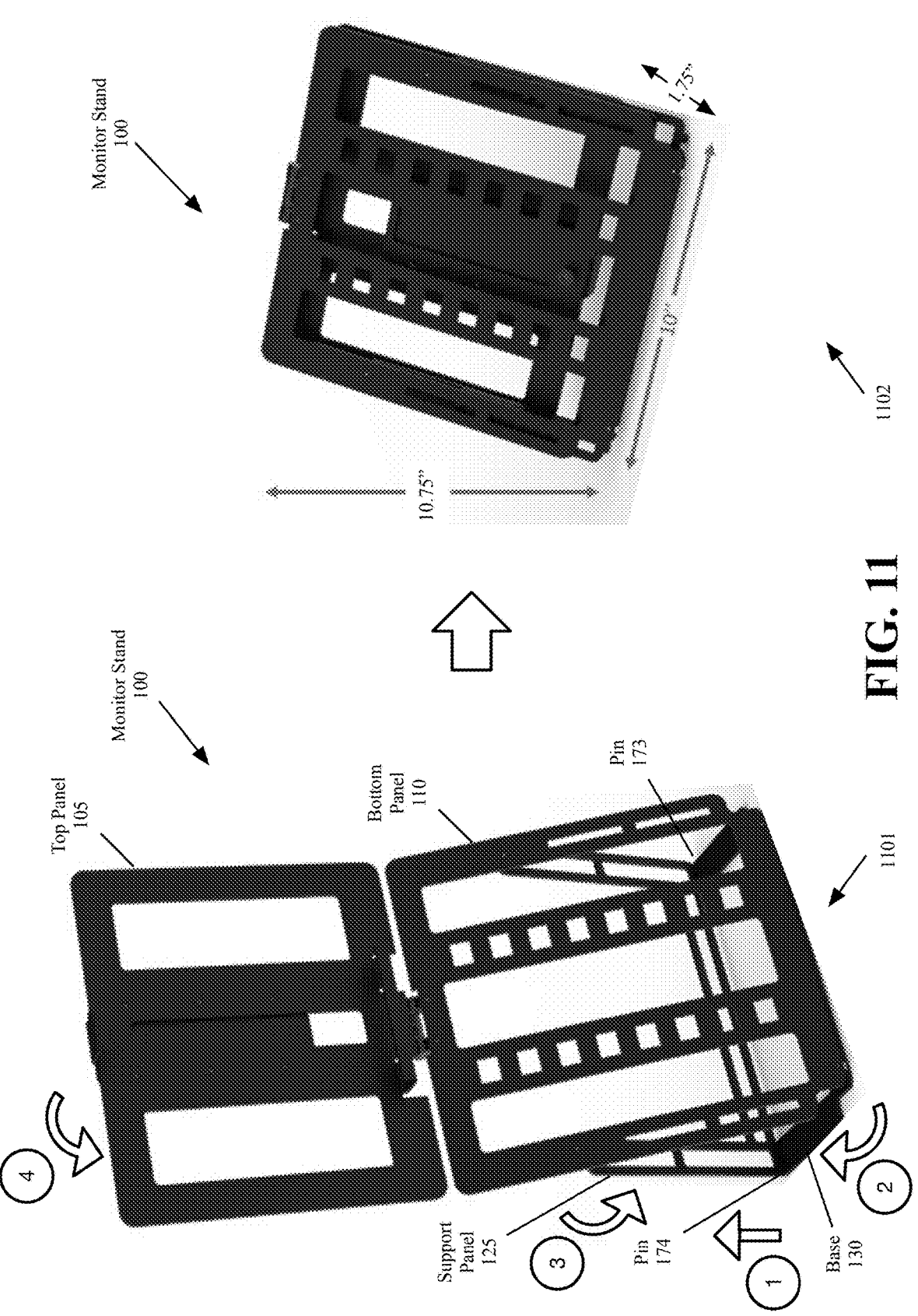
FIG. 11 is a functional diagram illustrating how a monitor stand may be folded, according to various aspects of the present disclosure.

FIG. 11 is a functional diagram illustrating how a monitor stand 100 may be folded, according to various aspects of the present disclosure. FIG. 11 includes two functional stages 1101-1102. Stage 1101 illustrates the steps required to fold the monitor 100. The steps are shown by arrows that are labelled from 1 to 4. As shown by arrow labelled 1, the first step for folding the monitor 100 is to detach the pins 173 and 174 from their corresponding holes 171 and 172 (FIG. 1C). For example, a person may lift the monitor stand 100 and slightly move the support panel 125 upward to disengage the pins 173 and 174 from their corresponding holes 171 and 172.

The next step is to fold (e.g., rotate) the base 130 around the miniature hinge(s) 140 (FIG. 1C) to rest the base 130 on the back of the bottom panel 110, as shown by the arrow labelled 2. Next, the support panel 125 may be folded (e.g., rotated) around the miniature hinges 145 (FIG. 1C) to rest the support panel 125 on the back of the base 130 and the back of the bottom panel 110, as shown by the arrow labelled 3. The last step is to fold (e.g., rotate) the top panel 105 backward around the adjustable friction hinge 135 to rest against the support panel 125 as shown by the arrow labelled 4.

Stage 1102 shows the fully folded monitor stand 100. As shown in stage 1102, the monitor stand 100 in the folded state is folded to a size that does not exceed 1.75 inch by 10 inches by 10.75 inches. The dimension and angle ranges of different components of the monitor stand provided in this disclosure are essential and critical for the operation of the foldable monitor stand 100 of the present embodiments. The monitor stand of the present embodiments provides the technical advantage of being folded to a size that does not exceed 1.75 inches by 10 inches by 10.75 inches, allowing the folded monitor to be fit inside a backpack with a monitor and/or a laptop or inside a laptop case with a laptop. The monitor stand of the present embodiments further provides the technical advantage of having a weight that does not exceed 36 ounces, making it easy to lift and/or to carry around.

In a first aspect, a foldable monitor stand is provided. The monitor stand includes a base that includes a bottom surface for contacting a placement surface; and a top surface including several holes. The monitor stand includes a support panel that includes several pins. Each pin of the support panel corresponds to a hole of the base. The monitor stand includes a top panel and a bottom panel connected to the top panel by one or more hinges. The support panel is connected to the back surface of the bottom panel by several hinges. The bottom panel is connected to the base by one or more hinges. In an unfolded state of the monitor stand the support panel is rotated around the several hinges to make a first angle with the bottom panel, the bottom panel is rotated around the one or more hinges that connect the bottom panel to the base to make a second angle with the top surface of the base, and each pin of the support panel is inserted in the corresponding hole of the base.

In an embodiment of the first aspect, the foldable monitor stand further includes a shelf connected to a front surface of the top panel. The shelf is configured to hold the bottom edge of a monitor held by the top panel.

In another embodiment of the first aspect, the foldable monitor stand further includes a tray fixedly connected to the back surface of the top panel; and a sliding clip configured to slide up and down inside the tray to provide grip for a top edge of different size monitors held by the top panel.

In another embodiment of the first aspect, in the unfolded state of the monitor stand, the base is positioned behind the back surface of the bottom panel, allowing a laptop computer connected to the monitor to be positioned under the monitor without the laptop being positioned over the base.

In another embodiment of the first aspect, the length of the sliding clip is between 3.1 to 7.3 inches.

In another embodiment of the first aspect, the support panel includes a first support leg; a second support leg; and a support bar connecting the first and second support legs.

In another embodiment of the first aspect, at least a first pin of the support panel is located on the lower end of the first support leg, at least a second pin of the support panel is located on the lower end of the second support leg, at least a first hinge of the several hinges is connected to a front surface of the first support leg, and at least a second hinge of the several hinges is connected to a front surface of the second support leg.

In another embodiment of the first aspect, the first angle is between 33 to 37 degrees.

In another embodiment of the first aspect, the second angle is between 68 degrees to 72 degrees.

In another embodiment of the first aspect, the support panel makes a third angle with the base after the of pins on the support panel are inserted in the corresponding holes of the base. The third angle is between 73 to 78 degrees.

In another embodiment of the first aspect, the width of the support panel is between 9 to 11 inches and the length of the support panel is between 6.5 to 7.5 inches.

In another embodiment of the first aspect, the width of the base is between 9 to 11 inches and the length of the base is between 4 to 5.8 inches.

In another embodiment of the first aspect, the width of the top panel is between 9 to 11 inches and the length of the top panel is between 8 to 9 inches.

In another embodiment of the first aspect, the width of the bottom panel is between 9 to 11 inches and the length of the bottom panel is between 8.5 to 10.25 inches.

In another embodiment of the first aspect, the several hinges are connected to the back surface of the bottom panel at a distance of approximately ⅓ of the length of the bottom panel from a top edge of the bottom panel.

In another embodiment of the first aspect, the thickness of the support panel is between 0.125 to 0.25 inches, the thickness of the base is between 0.125 to 0.25 inches, the thickness of the top panel is between 0.125 to 0.25 inches, and the thickness of the bottom panel is between 0.125 to 0.25 inches.

In another embodiment of the first aspect, the bottom panel includes several openings that include a surface area of between 5 percent to 25 percent of the total surface area of the bottom panel to reduce a weight of the bottom panel.

In another embodiment of the first aspect, the support panel includes several openings that include a surface area of between 33 percent to 62 percent of the total surface area of the bottom panel to reduce an overall weight of the monitor stand.

In another embodiment of the first aspect, the top panel includes several openings that include a surface area of between 16.4 percent to 34.2 percent of the total surface area of the top panel to reduce an overall weight of the monitor stand.

In another embodiment of the first aspect, the monitor stand is configured to transition from the unfolded state to a folded state by detaching the pins on the support panel from the holes of the base, rotating the base around the one or more hinges that connect the bottom panel to the base to rest the base against the back surface of the bottom panel, rotating the support panel around the hinges that connect the support panel to the bottom panel to rest the support panel on a back surface of the base, and rotating the top panel around the one or more hinges that connect the top panel to the bottom panel to rest the top panel against a back surface of the support panel.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure.

What is claimed is:

1. A foldable monitor stand, comprising:
a base comprising:
    a bottom surface for contacting a placement surface; and
    a top surface comprising a plurality of holes;
a support panel comprising a plurality of pins, each pin in the plurality of pins of the support panel corresponding to a hole in the plurality of holes of the base;
a top panel; and
a bottom panel connected to the top panel by one or more hinges,
wherein the support panel is connected to a back surface of the bottom panel by a plurality of hinges, wherein the plurality of hinges comprises at least one hinge disposed on a left side portion of the back surface and at least one hinge disposed on a right side portion of the back surface, wherein the bottom panel is connected to the base by one or more hinges,
wherein, in an unfolded state of the monitor stand:
    the support panel is rotated around the plurality of hinges to make a first angle with the bottom panel,
    the bottom panel is rotated around the one or more hinges that connect the bottom panel to the base to make a second angle with the top surface of the base, and
    each pin in the plurality of pins of the support panel is inserted in the corresponding hole in the plurality of holes of the base.

2. The foldable monitor stand of claim 1, further comprising:
a shelf connected to a front surface of the top panel, the shelf configured to hold a bottom edge of a monitor held by the top panel.

3. The foldable monitor stand of claim 1, further comprising:
a tray fixedly connected to a back surface of the top panel; and
a sliding clip configured to slide up and down inside the tray to provide grip for a top edge of monitors of different sizes held by the top panel.

4. The foldable monitor stand of claim 3, wherein, in the unfolded state of the monitor stand, the base is positioned behind the back surface of the bottom panel, allowing a laptop computer connected to the monitor to be positioned under the monitor without the laptop being positioned over the base.

5. The foldable monitor stand of claim 3, wherein a length of the sliding clip is between 3.1 and 7.3 inches.

6. The foldable monitor stand of claim 1, wherein the support panel comprises:
a first support leg;
a second support leg; and
a support bar connecting the first and second support legs.

7. The foldable monitor stand of claim 6, wherein:
at least a first pin in the plurality of pins is located on a lower end of the first support leg,
at least a second pin in the plurality of pins is located on a lower end of the second support leg,
at least a first hinge in the plurality of hinges is connected to a front surface of the first support leg, and
at least a second hinge in the plurality of hinges is connected to a front surface of the second support leg.

8. The foldable monitor stand of claim 1, wherein the first angle is between 33 and 37 degrees.

9. The foldable monitor stand of claim 1, wherein the second angle is between 68 degrees and 72 degrees.

10. The foldable monitor stand of claim 1, wherein the support panel makes a third angle with the base after the plurality of pins on the support panel are inserted in the corresponding plurality of holes of the base, wherein the third angle is between 73 and 78 degrees.

11. The foldable monitor stand of claim 1, wherein a width of the support panel is between 9 and 11 inches and a length of the support panel is between 6.5 and 7.5 inches.

12. The foldable monitor stand of claim 1, wherein a width of the base is between 9 and 11 inches and a length of the base is between 4 and 5.8 inches.

13. The foldable monitor stand of claim 1, wherein a width of the top panel is between 9 and 11 inches and a length of the top panel is between 8 and 9 inches.

14. The foldable monitor stand of claim 1, wherein a width of the bottom panel is between 9 and 11 inches and a length of the bottom panel is between 8.5 and 10.25 inches.

15. The foldable monitor stand of claim 14, wherein the plurality of hinges is connected to the back surface of the bottom panel at a distance of approximately ⅓ of the length of the bottom panel from a top edge of the bottom panel.

16. The foldable monitor stand of claim 1, wherein:

a thickness of the support panel is between 0.125 and 0.25 inches, a thickness of the base is between 0.125 and 0.25 inches, a thickness of the top panel is between 0.125 and 0.25 inches, and a thickness of the bottom panel is between 0.125 and 0.25 inches.

17. The foldable monitor stand of claim 1, wherein the bottom panel comprises a plurality of openings comprising a surface area of between 5 percent and 25 percent of a total surface area of the bottom panel to reduce a weight of the bottom panel.

18. The foldable monitor stand of claim 1, wherein the support panel comprises a plurality of openings comprising a surface area of between 33 percent and 62 percent of a total surface area of the support panel to reduce an overall weight of the monitor stand.

19. The foldable monitor stand of claim 1, wherein the top panel comprises a plurality of openings comprising a surface area of between 16.4 percent and 34.2 percent of a total surface area of the top panel to reduce an overall weight of the monitor stand.

20. The foldable monitor stand of claim 1, wherein the monitor stand is configured to transition from the unfolded state to a folded state by:

detaching the plurality of pins on the support panel from the plurality of holes of the base, rotating the base around the one or more hinges that connect the bottom panel to the base to rest the base against the back surface of the bottom panel, rotating the support panel around the plurality of hinges that connect the support panel to the bottom panel to rest the support panel on a back surface of the base, and rotating the top panel around the one or more hinges that connect the top panel to the bottom panel to rest the top panel against a back surface of the support panel.

\* \* \* \* \*